June 14, 1966   E. W. JACKSON, JR   3,256,032
CAMP TRAILER SUPPORT JACK
Original Filed Feb. 12, 1962   2 Sheets-Sheet 1
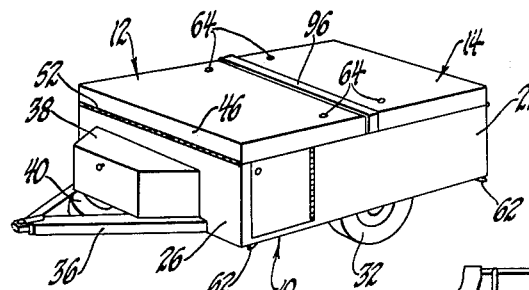
INVENTOR.
Elmer W. Jackson, Jr.
BY
Dale A. Winnie
ATTORNEY June 14, 1966     E. W. JACKSON, JR     3,256,032
CAMP TRAILER SUPPORT JACK
Original Filed Feb. 12, 1962     2 Sheets-Sheet 2
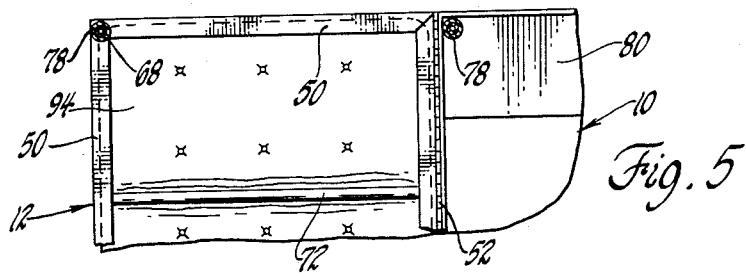
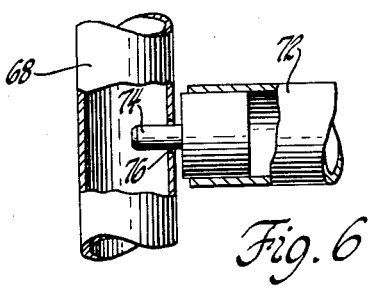
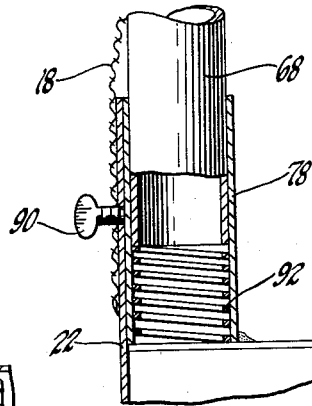
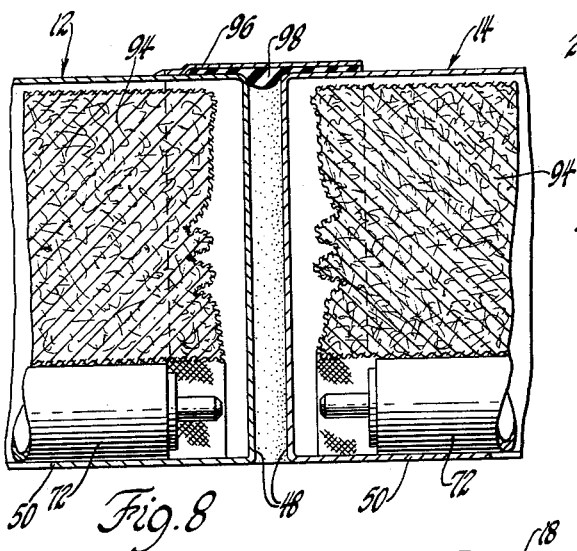
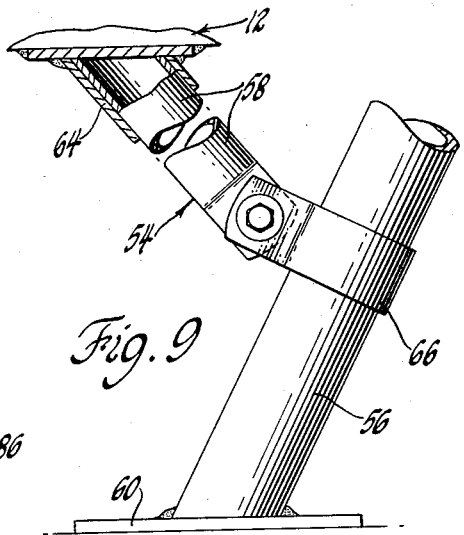
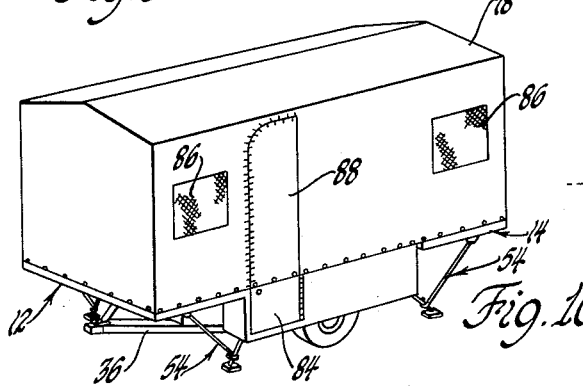
INVENTOR.
Elmer W. Jackson, Jr.
BY Dale A. Winnie
ATTORNEY United States Patent Office 3,256,032
Patented June 14, 1966

3,256,032
CAMP TRAILER SUPPORT JACK
Elmer W. Jackson, Jr., Washington, Mich., assignor to Bebco Experimental & Manufacturing Co., Romeo, Mich., a corporation of Michigan
Continuation of application Ser. No. 172,498, Feb. 12, 1962, now Patent No. 3,162,477, dated Dec. 22, 1964. This application June 8, 1964, Ser. No. 373,580
1 Claim. (Cl. 296—23)

This invention relates to utility and multi-purpose trailers in general, and more particularly to camp trailers, and is a continuation of application S.N. 172,498 co-pending herewith, now Patent No. 3,162,477.

There is an ever increasing demand for mobile camp trailers of moderate expense for family and group use on vacations, hunting and fishing outings, and the like. The trailer-type enclosure is preferred to the common tent because of the convenience of mobility, ready storage of camping equipment, dry weather quarters, etc.

Of the different type trailer enclosures, the tent trailer is becoming increasingly more popular for general camping purposes. The tent trailer is considerably less expensive than the small house trailer, can be knocked-down or dismantled for more compact storage when not in use, is more compact and accordingly less cumbersome in transit, and usually enables a boat or other camping equipment to be more easily loaded and unloaded from the top of the closed trailer assembly.

Of the numerous different types of tent trailers, the public generally prefers one which can be opened to moderate size and will accommodate an average size family of four or more adults. Adequate sleeping accommodations, ease of erecting and dismantling the tent enclosure, and reasonable floor space are the major considerations in the selection of these camp trailers.

As the name implies, the simple tent-trailer is usually little more than a tent enclosure erected on a trailer bed. The more simple tent-trailers usually require use of a major part of the living or floor space for sleeping accommodations and when storage cabinets and pull-out combination kitchen units are provided under the beds, the quarters are quite cramped when inclement weather requires that everyone occupy the tent-trailer at the same time.

A notable variation in tent-trailer structures is the use of drawer or platform members which may be extended from the basic trailer structure and usable for sleeping quarters. As will be appreciated, this arrangement provides much more living space than in the simple tent-trailer. However, most of these expandable tent-trailers have the drawer or platform extensions opening at the sides of the trailer and are somewhat unstable due to the lateral overhang. Furthermore, the drawer opening arrangement leaves little or no room for storage or built-in kitchen facilities since the sleeping drawers occupy most of the floor space until such time as they are pulled out for use.

In general, the tent-trailer has either developed as a simple tent carried in and erected on a trailer or as an over design and expensive sportsmen's dream. No real effort has been made to take advantage of the most desirable features of both the tent and trailer structures and to coordinate these features into a serviceable and relatively inexpensive camp trailer for general purpose use.

It is an object of this invention to provide a multi-purpose camp trailer and one which may be used for general utility purposes when stripped of its camp equipment. In this latter regard, the camp trailer of this invention is outfitted in a manner permitting its off-season use as a utility trailer, or even for such purpose at a camp site, if desired or necessary.

It is also an object of this invention to provide a trailer unit for general camping purposes and one having maximum living space as well as sleeping accommodations.

The camp trailer of this invention makes use of a tent cover readily erected over the trailer and as easily taken down, with provision for ample head room throughout the tent-trailer enclosure.

Another object of this invention is to provide a tent-trailer including means for disposing the sleeping accommodations in extended relation fore and aft of the trailer, rather than on opposite sides thereof, and having ground engaging supports and trailer jacks to assure maximum stability.

Still another object of this invention is to provide a tent-trailer having means for storing sleeping mattresses ready for immediate use in the course of setting up the trailer and in a secure and weather protected location while in transit.

A further object of this invention is to provide a tent-trailer having a tent structure and cover readily erected, and disassembled, and one which may be conveniently stored in a compact and unobstructed manner.

In the present instance the tent structure includes separate cover supporting cross frames receptive of ridge pole bars therebetween and with the cross frames having the tent cover already secured thereto. The cross frames are fit within the trailer members and one telescopically received in suitable corner posts provided in the trailer structure when erected. The ridge poles also fit in the trailer and are used to support the cover between the spaced cross frames.

These and other objects and advantages to be gained in the practice of this invention will be more readily understood and better appreciated after reading the following specification and with attention to the accompanying drawings directed to a preferred embodiment of this invention.

In the drawings:
FIGURE 1 is a perspective view of the camp trailer of this invention as closed and ready for transit.
FIGURE 2 is a side plan view of the camp trailer of this invention as erected for use and having the tent cover cut away in part to better illustrate the cover supporting structure.
FIGURE 3 is a top plan view of the camp trailer of this invention partially erected.
FIGURE 4 is a cross-sectional end view of the erected camp trailer as shown by FIGURE 2 in the plane of line 4—4 and looking in the direction of the arrows.
FIGURE 5 is an enlarged and fragmentary top plan view of part of the camp trailer structure of this invention.
FIGURE 6 is an enlarged and partly cross-sectioned view of a detail feature of the tent cover supporting structure.
FIGURE 7 is an enlarged and partly cross-sectioned view of another detail feature of the cover supporting structure.
FIGURE 8 is an enlarged fragmentary and cross-sectioned view of the mattress carrying cover members of the camp trailer structure in their closed positions.
FIGURE 9 is an enlarged and partly cross-sectioned view of the cover supporting and trailer jack members.
FIGURE 10 is a perspective view of the camp trailer structure as erected.

The camp trailer structure of this invention which is shown by the drawings includes a two wheeled trailer member 10 having cover lids 12 and 14 which open fore and aft. A tent cover supporting framework structure 16 is provided and is manually erected over the trailer and the cover lids in their open position. A tent canvas covering 18 is erected with the supporting framework and provides the final enclosure.

The trailer member 10 is an upwardly open box member having a floor 20 side walls 22 and 24 and end walls 26 and 28. The trailer wheels 30 and 32 are supported by an axle 34 mounted on the underside of the trailer floor 20 and without obstruction of the floor space in the trailer. A steering tongue 36 is provided on one end of the trailer and a storage box 38 is provided thereover and next to one of the trailer end walls.

Provision is made for storing a spare tire 40 within the steering tongue 36 and under the storage box 38.

The cover lids 12 and 14 are generally similar in construction and each includes depending side walls 42, 44 and end walls 46, 48. A structural reinforcing and inwardly extending flange 50 is also provided between the side and end wall portions.

The cover lids 12 and 14 are connected to the trailer member 10 by an elongated hinge 52 provided at the ends of the trailer and such as enables the cover lids to be opened fore and aft. The hinge 52 is preferably one which includes a removable hinge pin so that the cover lids 12 and 14 can be removed from the trailer if and when ever desired.

When the cover lids 12 and 14 are open their ends walls 46 abut the end walls 26 of the trailer and support the lids in a horizontally disposed position. The lids may be supported in this manner temporarily while the combination trailer jack and lid supports 54 are being placed in use.

Referring to FIGURE 9, the combination lid supports and trailer jack 54 include a trailer jack member 56 having a cover lid supporting brace 58 pivotally secured thereto. The trailer jack member 56 is preferably of tubular and heavy stock with a ground engaging foot piece 60 welded to the lower end. The other end is telescopically received within an outwardly inclined connector 62 provided at the corners of the trailer 10. The lid supporting brace 58 is likewise preferably of tubular stock and is similarly telescopically engaged within like connectors 64 provided on the cover lids. A simple clamp type connector 66 on the trailer jack members 56 provides the means for pivotal connection of the cover lid brace 58 thereto.

The cover supporting framework 16, as erected, includes four cross frame members 68 which are provided at spaced intervals along the length of the open trailer structure. The cross frame members 68 are formed as arches or cross bows and are adapted to receive ridge pole members 70 and 72 therebetween. The longer ridge poles 70 are received between the cross frame members 68 which are disposed over the trailer portion 10 and the shorter ridge poles 72 are engaged between these and the cross frame members 68 mounted on the cover lids 12 and 14.

The ridge poles 70 and 72 are engaged with the cross frame members 68 in the manner shown by FIGURE 6. The ridge poles each include a pin member 74 provided at opposite ends thereof and received within a receptive hold 76 provided in the cross frame members at spaced intervals along the cross bar portion thereof.

The cover supporting cross frame members 68 are preferably made of tubular stock and as one piece. They are vertically supported by being telescopically engaged within receptive tubular members 78 provided in the corners of the trailer member 10 and within the outer disposed corners of the open cover lids 12 and 14. The corner post members 78 are of sufficient length to orient and support the cross frame members 68 in the manner shown.

It will be appreciated that the trailer corner posts may be of full length and used in part as corner brace gussets for the trailer box and cover lid members.

The tent canvas covering 18 is preferably tied to the cross frame members, and the whole cover assembly may be readily received and stored within the trailer member 10.

FIGURE 3 shows the cross frame members 68 without the tent covering tied thereto and disposed within the trailer member 10 on the storage cabinet seats 80 and 82 provided along opposite sides of the trailer. One of the ridge pole members 70 is shown disposed across the cross frame 68 to show that it may also be conveniently stored within the trailer space.

In passing, it will be appreciated that the storage cabinets 80 and 82 also serve, in part, as wheel covers within the living space provided by the trailer body. The one cabinet 82 is shorter in length than the other to provide access to the living space through a door 84 provided in the side wall 22 of the trailer body.

The tent canvas covering 18 is fastened to the trailer body and cover lids by suitable fasteners of a conventionally known type. It may include suitable screened window openings 86 with weather closing inside flaps (not shown) and a zippered door opening 88, as shown by FIGURE 10.

FIGURE 7 shows a detail feature which enables the canvas covering 18 to be tightly secured by such as fasteners 90 to the trailer body and lid members and still accommodate slack and shrinkage in the cover member due to rain soaking and subsequent drying out.

A coiled compression spring 92 is disposed in each of the corner posts 78 and is placed in compression in the course of securing the cover to the trailer. The expected slack in the cover due to rain soaking is taken up by the expansion of the springs and the cover is kept taut. When the cover begins to dry out and shrink slightly, the springs are compressed. Thus the tent cover is able to expand and contract relative to the trailer and wind flapping damage and annoyance is held to a minimum.

Attention is now directed to a most important feature of the disclosed camp trailer which concerns the end opening cover members 12 and 14 and their adaptability to provide sleeping accommodation beyond and outside the living space of the trailer body.

As previously described, it will be appreciated that the cover lids 12 and 14 have sufficient depth to accommodate sleeping mattresses 94 therewithin. Further, the inwardly disposed flange 50 between the cover member side and end walls is such as will retain the edges of the mattresses thereunder. More important, as regards the flanges 50 along the opposite cover walls 46, is the fact that they will receive the ends of the ridge pole member 72 thereunder. As shown by FIGURES 5 and 8 the ridge pole members 72 may be positioned across the cover lids 12 and 14, over the mattresses 94, and by compressing the mattresses 94 can be disposed to have their ends under the flanges 50 and thereby securely retain the mattresses within the cover lids. Accordingly, the cover lids 12 and 14 may be closed with the mattresses retained therein. In turn, the mattresses will be immediately available for use with the necessary bedding provided thereon when the cover lids are opened.

FIGURE 8 will be noted to also show that one of the cover lids, in this instance cover 12, may include a flange or band which over-laps the other cover member 14 and includes a sealing gasket 98 for weather protection when the trailer is closed and in transit. The weather sealing band 96 is preferably provided on the cover lid member hinged to the front end of the trailer so that the open edge thereof is disposed rearwardly of the direction in which the trailer travels to prevent rain water from washing under the flange while the trailer is in transit during bad weather.

The camp trailer of this invention is erected in the following manner:

The trailer jack and cover lid supports 54 are removed from the storage box 38 and the trailer jack legs 56 are erected under the trailer. The support braces 58 are left laying on the ground and extended outwardly.

The cover lid 12 is then opened to a horizontal position over the steering tongue 36. The cover lid 14 is next opened to a horizontally disposed position extending in the opposite direction beyond the end of the trailer body.

As each cover lid is opened, its respective brace 58 is raised into position and engaged with the lid to hold it in a horizontally secured position.

The cross frame members 68, with the tent canvas covering 18 tied thereto, are erected next. The ends of the cross frame members 68 are simply inserted within the corner posts 78 provided in the outer corners of the cover lids and the corners of the trailer body.

Normally, the cross frame members 68 are erected first at one end of the trailer and then at the other end.

The zippered door closure 88 in the covering 18 is then opened and the trailer is entered through the door 84.

The ridge poles 70 are positioned between the inner disposed cross frame members 68 and the ridge poles 72 are removed from their mattress securing positions and erected between the outer disposed cross frame members.

All that remains to be done is to fasten the lower edge of the canvas covering 18 to the trailer body and the extended cover lids.

The trailer is immediately ready for use.

To dismantle the trailer the aforementioned procedure is followed in reverse order.

In the event that the camp trailer is needed for general hauling purposes, it will be appreciated that the cover lids 12 and 14 may be disengaged from the trailer body and the cross frames 68, ridge poles 70, tent covering 18 and other camping equipment may be removed to provide a utility trailer. For this purpose, the cover lid hinge connection 52 is provided with a removable hinge pin arrangement as mentioned.

Although a preferred embodiment of this invention has been shown and described, it will be appreciated that other innovations and improvements are suggested. Such of these innovations and improvements as are within the spirit of this invention are to be considered as included within the hereinafter appended claim unless expressly excluded by the language thereof.

I claim:

A single axle utility trailer for camping and general purpose use, and comprising;

a trailer body member having bottom, side and end walls and cover members hinged to said end walls and opening to extended positions beyond the ends of the trailer body member, jack members engaged to said trailer body member under each corner thereof and inclined outwardly under the end wall thereof for axle pivoting stabilization thereof, and means provided between said cover members and the outwardly inclined side of said jack members for supporting the weight of said cover members as opened beyond the end of said trailer body member and simultaneously holding said jack members in trailer stabilizing ground gripping engagement.

said cover member weight supporting means being engaged to said cover members near the extended ends thereof and being inclined inwardly towards said trailer body member for converging and relatively adjustable engagement with said jack members between the ends thereof.

References Cited by the Examiner

UNITED STATES PATENTS

| 1,386,943 | 8/1921 | Moore | 296—23 |
| 3,096,065 | 7/1963 | Horne | 280—150.5 X |

FOREIGN PATENTS

| 499,326 | 1/1939 | Great Britain. |
| 661,905 | 3/1929 | France. |
| 998,255 | 9/1951 | France. |

BENJAMIN HERSH, *Primary Examiner.*

A. HARRY LEVY, MILTON BUCHLER, *Examiners.*